(12) United States Patent
Bell et al.

(10) Patent No.: US 7,390,093 B2
(45) Date of Patent: Jun. 24, 2008

(54) PROJECTION DISPLAY WITH COLOR SEGMENTED MICRODISPLAY PANEL

(75) Inventors: Cynthia S. Bell, Chandler, AZ (US); Martin Randall, Santa Cruz, CA (US)

(73) Assignee: Intel Corporation, Santa Clara, CA (US)

(*) Notice: Subject to any disclaimer, the term of this patent is extended or adjusted under 35 U.S.C. 154(b) by 241 days.

(21) Appl. No.: 11/061,277

(22) Filed: Feb. 18, 2005

(65) Prior Publication Data

US 2006/0187414 A1    Aug. 24, 2006

(51) Int. Cl.
  G03B 21/00    (2006.01)
  G02F 1/1335   (2006.01)
  H04N 9/31     (2006.01)
(52) U.S. Cl. .............................. 353/31; 348/761; 349/7
(58) Field of Classification Search ............. 353/31, 353/34, 37, 81, 82, 94, 98, 99, 102, 122; 348/744, 759–761; 349/5, 7, 8; 345/1.1, 345/1.2, 1.3, 3.1, 33, 38, 50; 359/618, 629, 359/634, 638–640
See application file for complete search history.

(56) References Cited

U.S. PATENT DOCUMENTS

| | | | |
|---|---|---|---|
| 6,179,423 B1 * | 1/2001 | Kato et al. ................. 353/31 |
| 6,585,378 B2 * | 7/2003 | Kurtz et al. ................ 353/31 |
| 6,767,100 B1 * | 7/2004 | Long et al. ................. 353/31 |
| 6,799,850 B2 * | 10/2004 | Hong et al. ................ 353/30 |
| 7,048,380 B2 * | 5/2006 | Sokolov .................... 353/20 |
| 2002/0063818 A1 * | 5/2002 | Anderson et al. ............ 349/96 |
| 2002/0190922 A1 * | 12/2002 | Tsao ........................ 345/32 |
| 2003/0076423 A1 * | 4/2003 | Dolgoff .................. 348/222.1 |
| 2004/0109139 A1 * | 6/2004 | Kiser et al. ................ 353/31 |
| 2005/0018308 A1 * | 1/2005 | Cassarly et al. ............ 359/630 |

* cited by examiner

Primary Examiner—Rochelle-Ann Blackman
(74) Attorney, Agent, or Firm—Trop, Pruner & Hu, P.C.

(57) ABSTRACT

A single panel display may have discrete, dedicated segments associated with each of the primary colors. The segments may not be equally sized in some embodiments. The light from a light source may be split into color portions that are adjusted to accommodate to the differently sized segments dedicated to different colors.

9 Claims, 2 Drawing Sheets

PROJECTION DISPLAY WITH COLOR SEGMENTED MICRODISPLAY PANEL

BACKGROUND

This invention relates generally to projection displays.

A projection display system typically includes one or more spatial light modulators (SLMs) that modulate light for purposes of producing a projected image. The SLM may include, for example, a liquid crystal display (LCD) such as a high temperature polysilicon (HTPS) LCD panel or a liquid crystal on silicon (LCOS) microdisplay, a grating light valve or a MEMs (where "MEMs" stands for micro-electro-mechanical devices) light modulator such as a digital mirror display (DMD) to modulate light that originates from a lamp of the projection display system.

In typical projection display systems, the lamp output is formatted with optics to deliver a uniform illumination level on the surface of the SLM. The SLM forms a pictorial image by modulating the illumination into spatially distinct tones ranging from dark to bright based on supplied video data. Additional optics then relay and magnify the modulated illumination pattern onto a screen for viewing.

The SLM typically includes an array of pixel cells, each of which is electrically controllable to establish the intensity of a pixel of the projected image. In some projection display systems, SLMs are transmissive and in others, they are reflective. For the purposes of simplification, the discussion will address reflective SLMs.

An SLM may be operated in an analog manner by applying analog voltages to each pixel to effect a range of projected pixel brightnesses from black to grey to white. An SLM may also be operated in a digital manner so that each pixel has only two states: a default reflective state which causes either a bright or a dark projected pixel and a non-default reflective state which causes the opposite projected pixel intensity. In the case of an LCOS SLM, the pre-alignment orientation of the liquid crystal material and any retarders in the system determine whether the default reflective state is normally bright or normally dark. For the purposes of simplification, the discussion will denote the default reflective state as normally bright, i.e., one in which the pixel cell reflects incident light into the projection lens (the light that forms the projected image) to form a corresponding bright pixel of the projected image. Thus, in its basic operation, the pixel cell may be digitally-controlled to form either a dark pixel (in its non-default reflective state) or a bright pixel (in its default reflective state). In the case of a DLP SLM, the states may represent the pixel in a co-planar position to the underlying substrate.

Although its pixels are operated digitally, the above-described digitally-driven SLM may also be used in an application to produce visually perceived pixel intensities (called "gray scale intensities") between the dark and bright levels. For such an application, each pixel may be controlled by pulse width modulation (PWM), a control scheme that causes the human eye to perceive gray scale intensities in the projected image, although each pixel cell still only assumes one of two states at any one time. The human visual system perceives a temporal average of pixel intensity when the PWM control operates at sufficiently fast rates.

In the PWM control scheme, a pixel intensity (or tone) is established by controlling the time that the pixel cell stays in its reflective state and the time that the pixel cell remains in the non-reflective state during an interval time called a PWM cycle. This type of control is also referred to as duty cycle control in that the duty cycle (the ratio of the time that the pixel cell is in its reflective state to the total time the pixel cell is in its non-reflective and reflective states) of each PWM cycle is controlled to set the pixel intensity. A relatively bright pixel intensity is created by having the pixel cell spend a predominant proportion of time in its reflective state during the PWM cycle, while a relatively dark pixel intensity is created by having the pixel cell spend a predominant amount of time in its non-reflective state during the PWM cycle.

Projection displays with single microdisplay panels that serve all three primary colors may be desirable to meet mass market price targets for large screen, high definition, televisions. Known single-panel display systems suffer from brightness losses and/or visual artifacts that consumers may find objectionable. For example, single-panel light engines may time share the single panel for red, green, and blue images, while illumination is sequentially modulated by means of a color wheel or spinning prism. For example, with a color wheel, with green data displayed, green illumination is applied to the panel. With blue data displayed, blue illumination is applied to the panel. With red data displayed, red illumination is applied to the panel. In a scrolling prism system, all three narrow color strips of red, green, and blue illumination move down or across the panel. The data must be synchronized to display the correct data for the color of impinging illumination.

Another approach for single-panel light engines uses microdisplay panels illuminated with white light, but integral to the panel are pixel-sized filters or diffractive or dispersive elements in a per pixel pattern to segregate incoming light by wavelength. In such systems, each pixel modulates light from a single color band, either red or green or blue.

Using time sequential illumination by red, green, and blue light may be subject to limitations, depending on whether the system is modulated by a color wheel or a rotating prism. If the illumination is modulated by the color wheel, the system brightness may suffer because only one-third of the illumination wavelengths are passed by the color wheel to impinge on the SLM Further, during periods when the color spoke transitions through the illuminating beam, the panels must be held in their dark state. When this is not done, the display does not achieve full saturation in each of the primary colors. Together, these two effects significantly reduce the brightness of a colorwheel based system. In the rotating prism approach, the illumination is modulated by color prefiltering and then bands of red, green, and blue light are scrolled by the rotation of the prism. Thus, all wavelengths of the illumination source pass through the prism onto the SLM. However, some rows or columns of a scrolling panel must also be held dark where the colors transition. Thus, the overall reflecting surface is reduced. Overall, color sequential systems may be less bright than non-temporal systems.

Further, color sequential illumination may cause visual artifacts. These artifacts are known as color breakup artifacts and are the result of an object of interest moving across the screen and being imaged by the viewer's eye. If the eye and the object have relative motion, the subsequent retinal images do not overlap spatially. Instead, there will be a motion displaced blue image, then a motion displaced red image, then a motion displaced green image. The eye does not fuse the three color records in such cases and color break up is perceived. The image can still exhibit color breakup in video systems when color fields are sequentially updated as rapidly as 2000 Hertz.

Thus, there is a need for better ways to make improved single-panel projection displays.

DETAILED DESCRIPTION

Figure 1:
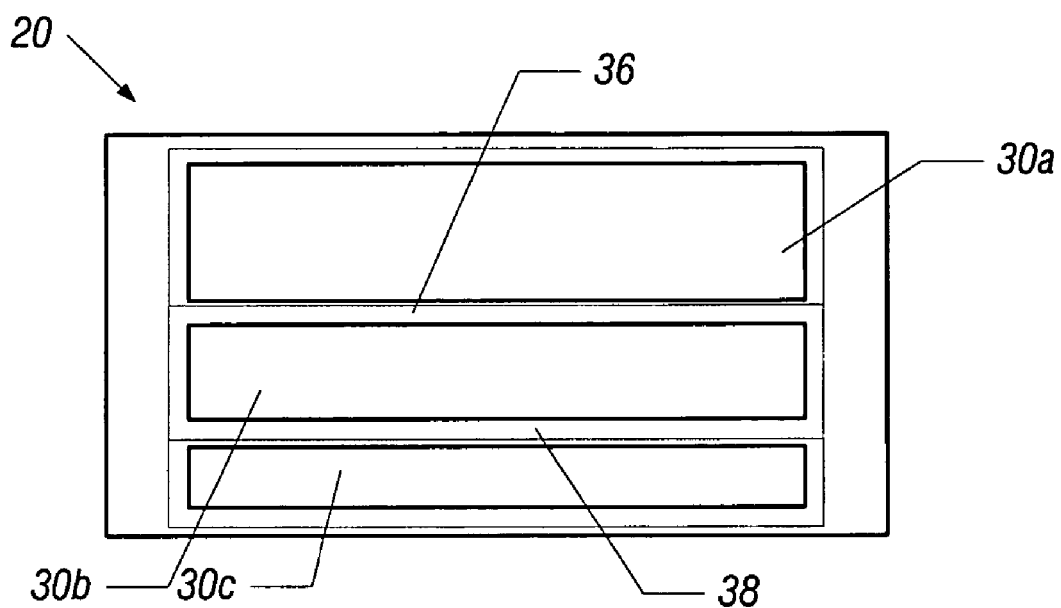
FIG. 1 is a depiction of a microdisplay in accordance with one embodiment of the present invention.

Referring to FIG. 1, a microdisplay 20 may be broken up into sub-arrays or contiguous segments 30a, 30b, and 30c. Each of the segments 30a-c may be dedicated to a particular color, each segment 30a-c including a plurality of contiguous pixels of the same color of illumination. The microdisplay 20 may be a single-panel microdisplay using a single panel to form all three colors.

Between the segments 30a-c are unused zones 36 and 38. The unused zones 36 and 38 may be about 12 percent by geometric area and may be used for underlying circuits in one embodiment. The zones 36 and 38 accommodate for the limits of conventional optics, alignment tolerances, and light fall off.

If the microdisplay 20 is a liquid crystal-on-silicon type, it is desirable to treat the segments 30a-c as one integrated unit, in the liquid crystal filling operation. For best contrast, the zones 36 and 38 between segments 30a-c may always be held in the dark, non-reflecting state in one embodiment. Since these zones 36 and 38 are optically non-active spaces, they may include a higher density of cell gap support such as spacer beads or pillars, to improve panel reflectance uniformity.

The segments 30a-c may have different aspect ratios for red, green, and blue. For example, more efficient packing may be achieved by fitting two sub-arrays side-by-side, above or below another sub-array. A projection display may conform to the arrangement of segments 30a-c in delivering the position of the illuminant onto the microdisplay 20 and in shaping the light to the required aspect ratio for each segment 30a-c.

In other embodiments, each of the segments 30a-c may have differing resolution. This is a degree of freedom not known in existing approaches. The human visual system perceives luminance dominantly from green wavelengths. In particular, the luminance is perceived 20 percent red, 70 percent green, and 10 percent blue. The number of pixels in the red and blue sub-arrays may be reduced to achieve various cost and performance combinations. For example, a full resolution green array may be combined with a sub-sampled red array and a sub-sampled blue array.

A variety of liquid crystal materials may be utilized for a liquid crystal-on-silicon embodiment. For example, high contrast, high stability liquid crystal material with low switching speed may be used, such as vertically aligned nematic (VAN) LC material. Conventional one-panel systems using temporal modulation may not incorporate the more stable VAN liquid crystal materials because they do not switch fast enough. With this new approach, a single panel display system may run at 120 Hertz and be entirely free of color breakup artifacts. The system may use luminous energy from the light source efficiently without temporal losses or traveling bands of inactive pixels as in other embodiments.

The reflecting area of each segment 30a-c may deliver a pre-white balanced image to a screen. This is a degree of freedom not known in existing approaches. For example, using a typical 100 Watt ultra high pressure (UHP) lamp, the SLM area ratios of green, red, and blue may be 100 percent red, to 68.6 percent green, to 54.4 percent blue in one embodiment. In other words, the segment 30a for red may be the largest segment, followed by the segment 30b for green and the segment 30c for blue in one embodiment. Those ratios accommodate not only for the UHP lamp spectrum, but also for the human visual spectral sensitivities to red, green and blue light. Generally, the areas can be adjusted to account for lamp spectral imbalance and the proportions of light needed to faithfully produce the correct hues.

Figure 2:
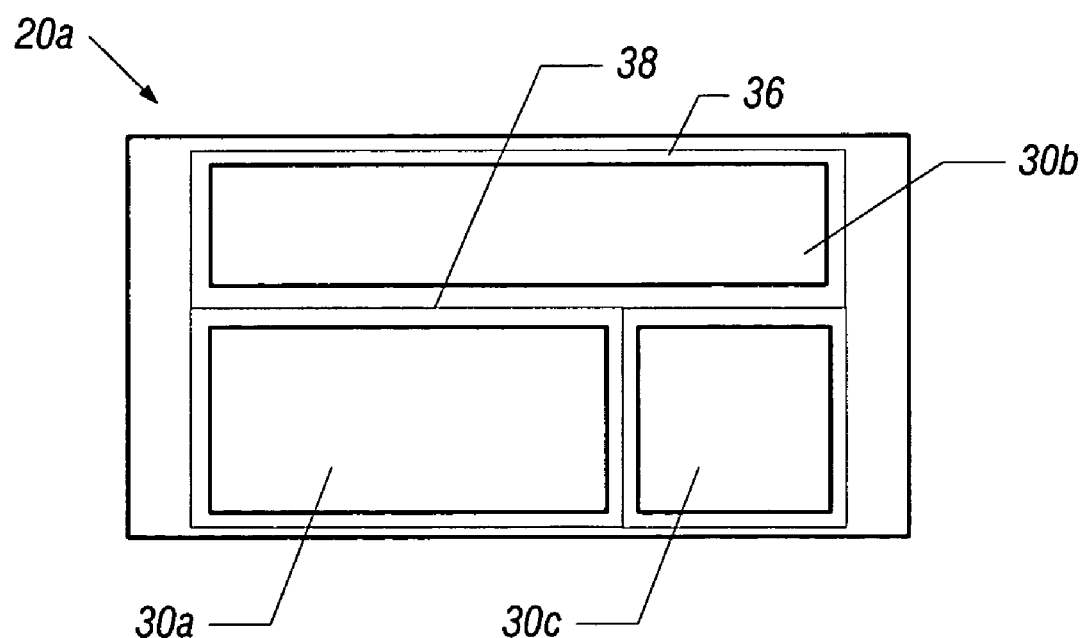
FIG. 2 is a depiction of another embodiment of a microdisplay in accordance with one embodiment of the present invention.

Referring to FIG. 2, in accordance with another embodiment, the microdisplay 20a has contiguous segments 30a-30c, but those segments are sized differently and arranged differently. In particular, a green segment 30b extends completely across the width of the microdisplay 20a at the top. The region below is thicker, but is divided between the red segment 30a and the blue segment 30c. This is in keeping with the fact that the human visual response is such that 70 percent of the spatial information is derived from green light and approximately 30 percent from red light. In other words, the spatial information that the human eye acquires is 70 percent based on green light and 30 percent on red light. The remaining ⅓ section of the lower region is devoted to the blue segment 30c, to reproduce correct hues. In some embodiments, there is one blue pixel for every four green pixels and one red pixel for every two green pixels. In the embodiment shown in FIG. 2, the length of the red area 30a is twice the length of the blue area 30c.

Figure 3:
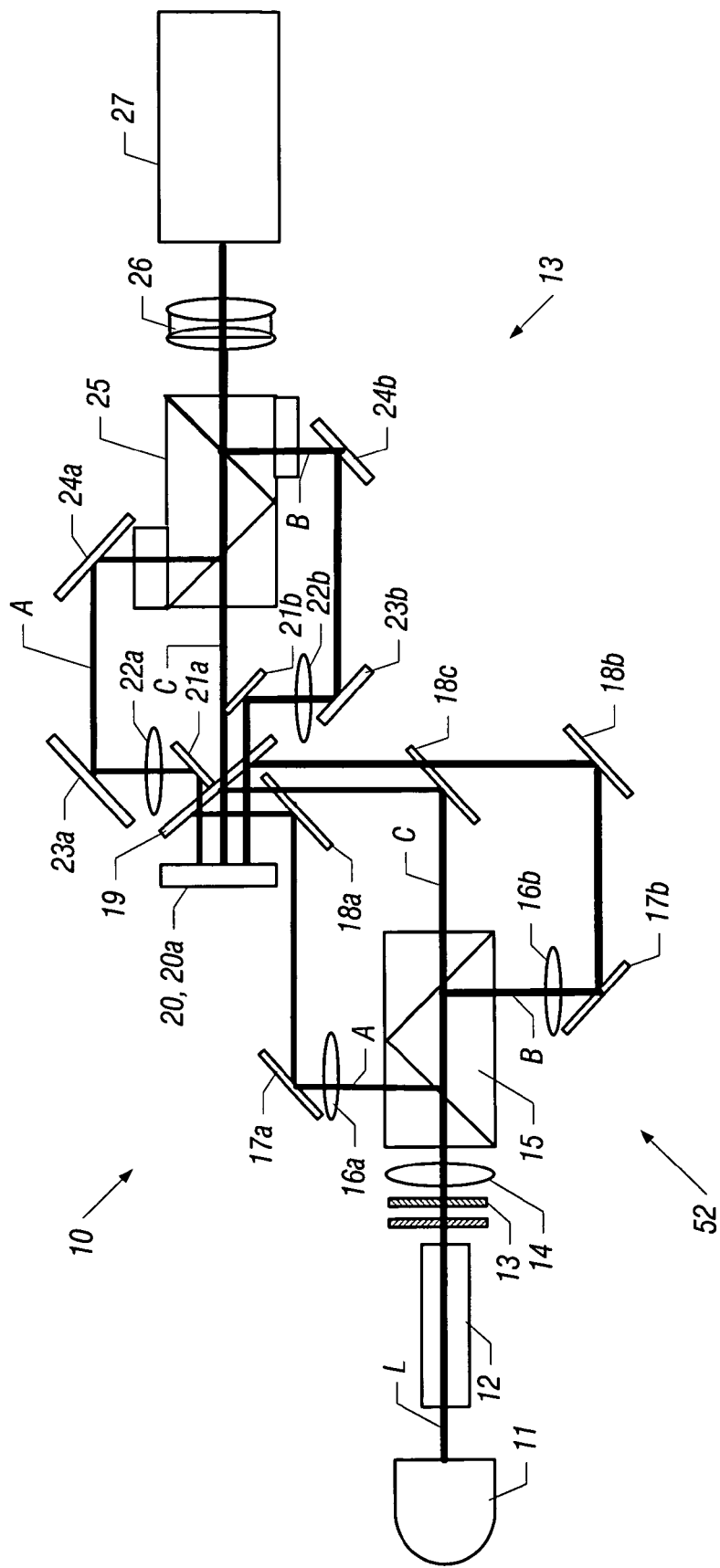
FIG. 3 is a schematic depiction of a projection display according to one embodiment of the present invention.

Referring to FIG. 3, the projection display 10 includes a lamp 11 such as a UHP lamp. It may emit broadband illumination "L" in the visible spectrum and beyond. That illumination passes through a homogenizing light pipe or integrating rod 12 that, in one embodiment, forms the illumination into a uniform, rectangular, beam shape, called a light box. The light pipe 12 may also incorporate illumination polarization and polarization recovery.

The illumination beam then passes through an illumination forming section 52 that may include dichroic and absorptive ultraviolet and infrared filters 13 that allow only visible wavelengths to pass. If not incorporated in the light pipe 12, the filters 13 may include a pre-polarizer to select one polarization for the light to be supplied to the microdisplay 20.

A relay lens 14 may include one or more lens elements that magnify and/or collimate the light beam. After the lens 14, the light box may have the aspect ratio of the green microdisplay segment 30b.

Dichroic based illumination splitters 15 and 25 redirect the red wavelength on one path A, pass the green wavelength on another path C, and redirect the blue wavelength on still another path B. The splitter 15 may act as a dichroic separator, while the splitter 25 may act as a dichroic combiner. The splitter 15 may, for example, be a V-prism as illustrated in FIG. 3. The splitter 15 splits the red and blue light and passes green light in one embodiment. Other illumination splitters may also be used, such as the immersed or free-standing dichroic "x-cube" arrangement, or successive, similarly angled, individual dichroic filters. The recombining path may be designed with additional glass to match the path lengths of the red, green, and blue images.

The elements 16 and 22 (where the letter A indicates the red path, the letter B indicates the blue path, and the letter C indicates the green path) represent one or more lenses that act to reshape the aspect ratio of one or more wavelength components of the light box. The elements 16 and 22 may be anamorphic lenses. In one embodiment, the elements 16 and 22 change the vertical height of the illuminant to correspond to the different vertical heights of the segments 30a-c. The elements 17, 18, 21, 23, and 24 may be plano-mirrors, sometimes called folding mirrors.

The green path C may be free of anamorphic re-sizing in one embodiment. This enables the green image to have improved spatial fidelity. Thus, the green image, which is most important to human visual response, may than be less subject to distortion, such as barrel or pin cushion distortion. However, in some embodiments, elements 16 and 22 may also be used in the green light path C.

A wire grid polarization beam splitter 19 may be a Moxtek beam splitter made by Moxtek, Inc. of Orem, Utah. The splitter 19 reflects light of one polarization (that produced by filter 13) and passes light of the other polarization. Other conventional glass polarization beam splitters may be used, but may exhibit lower overall system performance.

A pixilated light valve, such as a reflective mode liquid crystal-on-silicon microdisplay panel, may be utilized as the microdisplay 20 or 20a. Alternatively, the microdisplay 20 or 20a may be a microelectromechanical system or some other technology. The microdisplay 20 or 20a either changes (rotates) or does not change the polarization of the incident light at particular pixels. Light whose polarization is unchanged is reflected by splitter 19, while light whose polarization is changed passes through the splitter 19. Light passing through the splitter 19 produces bright spots in the projected display.

An optional lens group 26 forms a real image to ease the design constraints on the projection lens, especially its back focal distance. A projection lens 27 projects the image onto a screen (not shown).

The structure shown in FIG. 3 also generally represents an arrangement which is suitable for implementing a projection display using the microdisplay 20a (FIG. 2). For example, the anamorphic lens 16a (FIG. 3) may shrink the aspect ratio in the x and y dimensions for this embodiment. The anamorphic lens 16a condenses the light so that the red light falls on the red segment 30a in the lower area of the microdisplay 20a.

In contrast, for the microdisplay 20, the anamorphic lens 16a may only change the height of the red color. In one embodiment using the microdisplay 20, the red light is directed to the top region 30a as shown in FIG. 1.

To take the red example again, in both embodiments, the lens 22a reverses the size change created by the lens 16a. For example, the red light may be reverted back to the same size as the green beam so that the splitter 25 can put those beams back together. In other words, the splitter 25 receives the red light on the path A, the green light on the path C, and the blue light on the path B and recombines them, for example, using a V-prism in the illustrated embodiment. Of course, other dichroic splitters or combiners may be utilized as well.

In some embodiments, the anamorphic lens 16b, in the blue beam path illumination forming section 11, may compress the light box while the corresponding anamorphic lens 22b, in the blue light path, uncompresses to the same degree. The corresponding compression and decompression may be done on the other light paths as well. In short, the effects induced in the illumination forming section 11 are undone by corresponding elements in the image projection section 13. However, in some embodiments, the resolution of the optics in the downstream image projection section 13 may be improved compared to those in the upstream illumination forming section 11.

A V-prism may be formed by securing together two prisms at an angle of 45°, such that their working surfaces form a V. Conversely, the elements 15 and 25 may be made by an X-cube in which optical interfaces are formed without glass with two dichroic mirrors that are physically aligned so that they intersect and their working surfaces form an X-shape.

Thus, in some embodiments, the rectangular light box is split into red, green, and blue color components. The light for any or all of the colors may be anamorphically shaped to match the vertical (and horizontal) extents of the corresponding segments 30a-c on the microdisplay 20 or 20a. The elements 7, 18, 21, 23, and 24 direct each color light to the correct segment 30a-c. The video image formed on each segment 30a-c may be anamorphically reformatted back to one identical size image and recombined spatially while still maintaining focus. This may necessitate equal path lengths from the microdisplay 20 or 20a to the projection lens 27. The components in the image projection section 13 of the light engine advantageously do not introduce undue distortion or aberration in some embodiments.

Providing segments 30 that are permanently dedicated to each primary color, eliminates temporal artifacts since on-screen pixels are formed, just as in three-panel projection systems, from pixels of all three colors simultaneously and continuously. In particular, the color breakup problem is eliminated in a single chip embodiment.

In some embodiments, brightness is also maximized, as all illumination colors are used all the time. The display may have fewer mechanical parts than a three light valve system and fewer moving parts than a two light valve system. Namely, it may have no color wheel, color switch, or rotating prism, and no control feedback synchronization components in some embodiments. Some embodiments may require less power to operate than existing systems to exhibit higher levels of physical robustness.

Having the segments 30a-c on one chip may reduce unit packaging costs and remove the need for multiple flex cables in some cases. Having all of the segments 30a-c on a single chip may enable greater efficiency in the liquid crystal fill in assembly operations, as only one cell may need to be filled in lieu of three in some embodiments. The size of each of the segments 30 may be adapted to accommodate for the human visual response and/or the spectrum of light produced by the projection display light source, in some embodiments. The spaces between active segments 30a-c may contain a higher density of cell gap support to improve uniformity and yield. If all segments 30a-c are co-planar, the light engine alignment and focusing for the color fields may be substantially eased compared to existing systems. The display 10 need not use an expensive driver board memory buffering and communication buses in some cases. Since the display 10 is not required to refresh a high rate, the data delivered to the imager may be simplified.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A microdisplay comprising:
 a contiguous first segment for pixels of a first color, a contiguous second segment for pixels of a second color, and a contiguous third segment for pixels of a third color, wherein said first, second, and third segments are coplanar and wherein said first color is red, said second color is green, and said third color is blue, and wherein said first segment is larger than said second or third segments;
 wherein said second segment is stacked over said first and third segments; and wherein there are approximately four green pixels to two red pixels to one blue pixel.

2. The microdisplay of claim 1 wherein said microdisplay is formed of a single-panel display.

3. The microdisplay of claim 1 wherein each of said segments is rectangular and vertically displaced with respect to one another on a single panel.

4. The microdisplay of claim 1 wherein said microdisplay is a liquid crystal-over-silicon microdisplay.

5. A method comprising:
   forming a microdisplay with a contiguous first segment of pixels dedicated to light of a first color;
   forming said microdisplay with a contiguous second segment of pixels dedicated to light of a second color; and
   forming said microdisplay with a contiguous third segment of pixels dedicated to light of a third color, wherein at least two of said segments are coplanar;
   forming said first segment of red, said second segment of green, and said third segment of blue and stacking said first, second, and third segments in that order; and
   making the first segment bigger in area than said second or third segments.

6. The method of claim 5 including forming the ratio of areas of said first to said second to said third segment to be 100 to 68.6 to 54.4.

7. The method of claim 5 including forming the second segment which is the green segment over a first and third segments.

8. The method of claim 7 including forming said second segment to be four times the size of said third segment which is the blue segment and forming said first segment to be two times the size of said third segment.

9. A microdisplay comprising:
   a contiguous first segment for pixels of a first color, a contiguous second segment for pixels of a second color, and a contiguous third segment for pixels of a third color, wherein said first, second, and third segments are coplanar and wherein said first color is red, said second color is green, and said third color is blue, and wherein first segment is larger than said second or third segments, wherein the ratio of areas of the first to the second to the third segment is 100% to about 68.6% to about 54.4%.

\* \* \* \* \*